United States Patent
Rossi et al.

(10) Patent No.: US 6,645,627 B1
(45) Date of Patent: Nov. 11, 2003

(54) VITREOUS FILLER FOR PLASTIC MATERIALS AND RESINS AND METHOD FOR OBTAINING SAME

(75) Inventors: Francesco Rossi, Spotorno (IT); Antonio Ferrante, Milan (IT)

(73) Assignee: Saint-Gobain Vetrotex France S.A., Chambery (FR)

( * ) Notice: Subject to any disclaimer, the term of this patent is extended or adjusted under 35 U.S.C. 154(b) by 0 days.

(21) Appl. No.: 09/926,316

(22) PCT Filed: Apr. 13, 2000

(86) PCT No.: PCT/FR00/00961

§ 371 (c)(1), (2), (4) Date: Jun. 14, 2002

(87) PCT Pub. No.: WO00/61513

PCT Pub. Date: Oct. 19, 2000

(30) Foreign Application Priority Data

Apr. 14, 1999 (IT) .......................................... MI99A0768

(51) Int. Cl.[7] .................................................. B32B 5/16
(52) U.S. Cl. ........................ 428/404; 428/375; 428/390; 428/406; 428/407
(58) Field of Search ................................. 428/403, 404, 428/406, 407, 375, 390

(56) References Cited

U.S. PATENT DOCUMENTS

| | | | | |
|---|---|---|---|---|
| 3,998,985 A | * | 12/1976 | Kitaj | |
| 4,330,444 A | * | 5/1982 | Pollman | |
| 4,626,560 A | * | 12/1986 | Marsden et al. | |
| 4,874,858 A | * | 10/1989 | Magistro | |
| 5,034,276 A | * | 7/1991 | Zwiersch et al. | |
| 5,128,203 A | * | 7/1992 | LaRoche | |
| 5,470,658 A | * | 11/1995 | Gasca et al. | |
| 5,759,687 A | * | 6/1998 | Arpin et al. | |
| 6,051,316 A | * | 4/2000 | Boissonnat et al. | |
| 6,139,958 A | * | 10/2000 | Raghupathi et al. | |
| 6,183,676 B1 | * | 2/2001 | Gonthier | |
| 6,319,344 B1 | * | 11/2001 | Lewno | |

FOREIGN PATENT DOCUMENTS

| | | |
|---|---|---|
| DE | 87 012 | 1/1972 |
| WO | WO 92/01024 | 1/1992 |

OTHER PUBLICATIONS

Derwent Abstract, AN 1993–055211, JP 05–004994, Jan. 14, 1993.

* cited by examiner

*Primary Examiner*—H. Thi Le
(74) *Attorney, Agent, or Firm*—Oblon, Spivak, McClelland, Maier & Neustadt, P.C.

(57) ABSTRACT

A filler (1) is envisioned which comprises glass-based granules (2) provided with a sizing composition, in which filler each of the granules (2) consists of a multiplicity of milled glass fragments (3) agglomerated together by the agency of a sizing composition (4) containing especially a compound chosen from esters of alkylsilicic acids, particularly an aminosilane. The process comprises a milling step (6) during which the glassy material is comminuted into fragments by this milling, a metering step (7) during which a mixture including the fragments (3) and the sizing composition (4) is formed and an agglomeration step (8) during which the mixture is dried so as to form granules each including a multiplicity of fragments (3) and dried parts of the sizing composition (4).

21 Claims, 1 Drawing Sheet

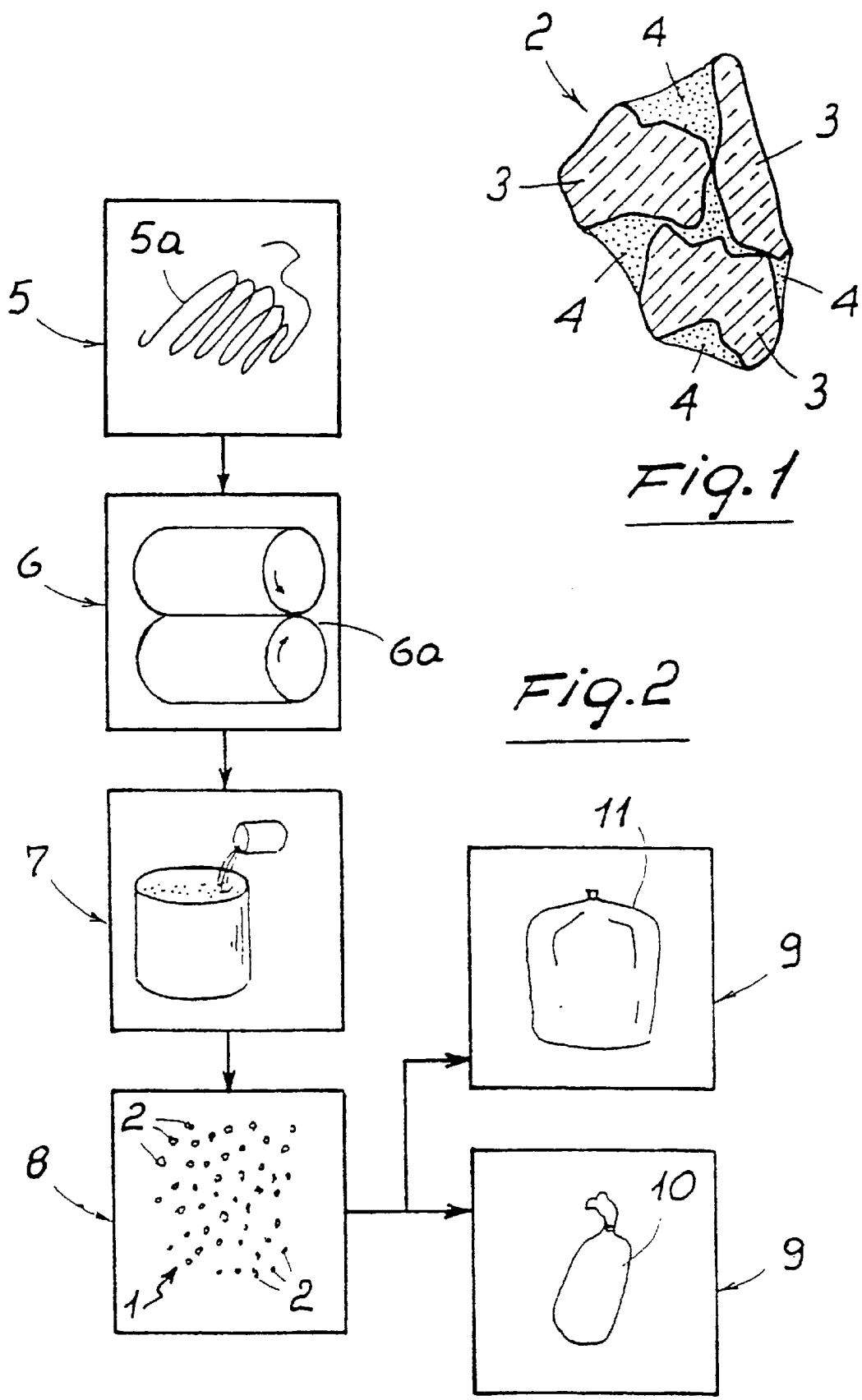

US 6,645,627 B1

VITREOUS FILLER FOR PLASTIC MATERIALS AND RESINS AND METHOD FOR OBTAINING SAME

BACKGROUND OF THE INVENTION

FIELD OF THE INVENTION

The subject of the invention is a filler is a filler of the glassy type for plastics and resins and a process for obtaining it.

DESCRIPTION OF THE BACKGROUND

As known, <<fillers>> are of great importance in the overall composition of articles and products based on resins, especially phenolic resins, and on plastics, especially when these articles and products are produced by a molding operation.

Fillers are an additive material which is normally incorporated into the polymers and can fulfil, depending on the situation, the function of simply filling the polymer or that of significantly reinforcing it.

As a percentage by weight, the amount of fillers may even be very high, for example 40%, and they can have a key influence on the physicochemical characteristics of the articles produced.

Among the various existing fillers, those of the glassy type are very important and very widely used, and one well-known type of glassy filler consists of minute, approximately spherical, glass elements hereafter called microspheres or granules, the maximum diameter of which is very small, for example about one tenth or one hundredth of a millimeter.

The polymers or <<matrices>> which surround these glass microspheres or granules result in articles whose abrasion resistance, impact strength, compressive strength and flexural strength are improved and which exhibit impermeability and enhanced acid and solvent resistance.

Further advantages resulting from the use of said glass microspheres or granules as fillers are the overall improvement in the electrical and thermal properties.

The molding operations are markedly improved because of the reduction in the in-mold shrinkage and a smoother and better finished molding surface is obtained.

There is also as a result a cost reduction in proportion to the cost and amount of microspheres added.

Unfortunately, these glass microspheres cannot be simply added to said materials or matrices made of plastic or phenolic resins.

This is because they require to be pretreated on the surface with substances, called <<sizing compositions>>, which act as a binder between the glass and the matrices in order to guarantee perfect and lasting adhesion to the glass. Among sizing compositions recognized as being the most effective are those commonly called <<silanes>>. These particular sizing compositions consist of molecules having one part provided with affinity for the glass of the microspheres and another part capable of copolymerizing with the matrices.

In practice, said microspheres or granules are basically made of glass coated with an appropriate-type sizing composition.

The abovementioned known technique obviously has advantages and disadvantages. As already mentioned, the advantages relate to the qualitative improvement to the end-products which contain said microspheres. The drawbacks stem from a certain difficulty in the production of said microspheres and from their cost.

This is because they must have well-defined dimensions. In particular, the glass particles which form them must have small dimensions, between one tenth and one hundredth of a millimeter. In order to produce such particles, very expensive systems and equipment must be used.

Furthermore, the subsequent application of the sizing compositions introduces an additional phase which adds to the production phase of the glass part, with a substantial cost increase.

The high production cost and application cost of sizing compositions consequently mean an increase in the cost of the end-products and considerably reduce the use of the fillers described.

In fact, it should not be forgotten that the fillers used in plastics are often regarded as a filling which makes it possible to reduce, in a simple and effective manner, the overall costs of the materials employed in the molding operations.

Another disadvantage stems from the fact that, despite the use of sizing compositions, the bonding of the microspheres or granules to the matrices is not always optimal. From this standpoint, it is certainly desirable to obtain better adhesion between the glass and the polymer.

The technical objective of the invention is therefore to substantially reduce the abovementioned disadvantages, particularly those associated with the cost and the process for manufacturing said micro-spheres or granules, and with the bondability of these microspheres or granules to the matrices which surround them.

SUMMARY OF THE INVENTION

This objective is achieved by the present invention which provides a glassy-type filler for plastics and resins, especially phenolic resins, the glassy filer comprising granules of glassy material which are provided with a sizing composition, wherein each of said granules comprises a multiplicity of fragments of glassy material agglomerated together by said sizing composition.

In the context of the present invention, the term "sizing composition" refers to compositions which act as a binder between the glass and the matrices in order to guarantee perfect and lasting adhesion to the glass. Among sizing compositions recognized as being the most effective are those commonly called "silanes". These particular sizing compositions consist of molecules having one part provided with affinity for the glass or the microspheres and another part capable of copolymerizing with the matrices.

According to advantageous characteristics:

said sizing composition comprises a compound chosen from esters of alkylsilicic acids;

said sizing is an aminosilane, in particular of formula $NH_2$—R'—$Si(OR)_3$, in which:

R' denotes an optionally substituted, saturated or unsaturated, linear or branched hydrocarbon chain advantageously containing from 1 to 20 carbon atoms, especially from 2 to 8 carbon atoms, preferably an alkylene chain;

R denotes an alkyl group, preferably having from 1 to 5 carbon atoms.

One particularly preferred silane is aminopropyltriethoxysilane $NH_2(CH_2)_3Si(OC_2H_5)_3$;

said granules have a maximum mean size of between twenty and sixty micrometers and comprise at least two of said fragments;

said fragments have on average a maximum linear dimension of between five and fifteen micrometers;
said fragments are made of glass, especially <<E>>-type glass;
said fragments are made of milled glass;
said fragments are portions of glass yarns;
the amount of said sizing composition is substantially between five and fifty parts per thousand parts, especially between five and twenty-five parts per thousand parts, by weight of the dry glassy material;
the sizing composition furthermore contains a mineral binder, such as a clay or a mixture of clays.

The subject of the invention is also a process for obtaining this filler, characterized in that it comprises: a milling step in which the glassy material is reduced to fragments; a metering step in which a mixture including said fragments and a sizing composition is formed; and an agglomeration step in which said mixture of fragments and sizing composition is dried so as to form compact granules each including a multiplicity of said fragments and of the portions of said dried sizing composition.

According to advantageous characteristics:
said milling step is preceded by a selection step in which glass yarns coming from production waste and scrap are chosen for said milling step;
said milling step is extended until fragments are obtained which have on average a maximum linear dimension of between five and fifteen micrometers;
during said milling step, water and a plasticizer and/or a mineral binder such as a clay, for example bentonite, are added to the glassy material;
during said metering step, said fragments are mixed with a sizing chosen from esters of alkylsilicic acids, especially an aminosilane;
during said metering step, said sizing composition is metered in an amount of between five and fifty parts per thousand parts by weight of dry glassy material;
during said agglomeration step, said mixture of fragments and sizing composition is heated to a drying temperature of between one hundred and twenty-five and one hundred and forty-five degrees Celsius;
said agglomeration step is carried out in a heated vessel and said mixture of fragments and sizing composition is injected into said vessel by means of compressed air so as to form granules having on average a maximum size of between twenty and sixty

BRIEF DESCRIPTION OF THE DRAWINGS

We will now describe, by way of nonlimiting example, a preferred embodiment of a glassy-type filler illustrated by the appended drawings in which:

FIG. 1 shows, highly schematically and on a very enlarged scale, the structure of a granule constituting the filler according to the invention; and FIG. 2 shows the sequence of the main steps of the process for manufacturing the granules of FIG. 1.

Referring to these figures, the filler according to the invention is indicated, overall and schematically, in its entirety by the reference number 1 within the context of FIG. 2.

The filler 1 is generally of the type formed from particles which may be termed approximately spherical elements or microspheres or granules of very small diameter, consisting here of glass provided with a sizing composition. These granules are intended to be embedded in plastics and phenolic resins in order to improve the many characteristics thereof, as indicated above.

In particular, as may be seen in FIG. 1, the filler 1 advantageously consists of granules 2 whose structure is of the composite type.

This is because each granule 2 essentially consists of a multiplicity of glass fragments 3 agglomerated together by means of a sizing composition 4 which comprises a sizing preferably chosen from particular silanes, the great effectiveness of which has been demonstrated experimentally: alkoxysilanes or esters of alkylsilicic acids.

Among esters of alkylsilicic acids, an amino-silane $NH_2-R'-Si(OR)_3$ is preferred in which R' denotes an alkyl group and R an organic group, and more particularly the aminosilane of formula $NH_2-(CH_2)-Si(OC_2H_5)_3$.

The silane contained in the sizing composition 4 which joins together the fragments 3 is present in an amount of approximately between five and twenty-five parts per thousand parts by weight of the dry glass.

The granules 2 have, on average, a maximum size of between twenty and sixty micrometers and contain at least two fragments 3. The term <<maximum size>> of the granules 2, which have a compact structure because of the tendency of the sizing composition to form drops, is understood to mean the maximum diameter taken in the most greatly developed direction of the granules.

In contrast, the fragments 3 have a particularly irregular profile and have, on average, a maximum linear dimension of between five and fifteen micrometers, and preferably equal to ten micrometers.

Another aspect of the invention resides in the fact that the fragments 3 are made of milled glass. For example, without excluding other types of glass, they may be portions of <<E>>-type glass yarns obtained by milling.

As known, <<E>>-type glass is a glass having optimum strength properties and a high elastic modulus, together with a high melting point. It may be defined as a calcium aluminum borosilicate, characterized by a very low alkali metal content.

Glass yarns of different diameters can be used, by mixing them, the diameters preferably being less than 10 micrometers.

Overall, purely by way of an example given of a preferred composition of the milled glass, the filler 1 may have the following composition:

| | |
|---|---|
| aminosilane $NH_2(CH_2)_3Si(OC_2H_5)_3$: | 1.95% by weight |
| silica $SiO_2$: | 71.5% by weight |
| sodium oxide $Na_2O$: | 13.43% by weight |
| calcium carbonate CaO: | 9.6% by weight |
| magnesium oxide MgO: | 3.23% by weight |
| alumina $Al_2O_3$: | 0.39% by weight |
| iron oxides $FeO/Fe_2O_3$: | 0.2% by weight |
| potassium oxide $K_2O$: | 0.1% by weight. |

The granules 2 thus produced have a minimal cost since they consist simply of milled glass and have a rough structure suitable for guaranteeing maximum bonding to the polymer matrices, without however introducing excessive irregularities. This is because the fragments 3 are partly coated with sizing composition 4 and are associated with other fragments so as overall to define a compact shape.

One advantageous characteristic of the granules 2 is that, once they have been produced, they do not need to be treated with a sizing composition: the latter is still present in the binder which agglomerates the fragments 3.

The invention also comprises a novel process for obtaining a glassy-type filler.

The process is composed of several steps. In the first place, there is a selection step, denoted by the reference number 5, in which the type of glass that has to undergo the successive operations is chosen.

For example, <<E>>-type glass and preferably glass yarns coming from production waste and scrap, such as those of the <<Borosil>> brand, consisting of wet glass waste obtained during the operation of fiberizing wet filaments, indicated schematically by the reference number 5a, is chosen.

Next, the chosen glass is subjected to a milling step 6 in which it is reduced to fragments.

The milling is carried out for example in wet mills of the <<Allubit>> type, that is to say mills known for milling ceramics and comprising rotating rolls lined with Allubit or sintered alumina, inside which there is a milling charge composed of Allubit spheres of various diameters.

The glass yarn is introduced with water and bentonite into these mills, which are shown simply by two rolls labeled 6a.

Bentonite is a well-known natural mixture essentially consisting of clay minerals and has the property of being a plasticizer in the wet state and a tackifier in the dry state.

In the mills, the milled mass is composed approximately of one percent by weight of bentonite, the rest consisting of glass and water in equal parts.

The bentonite and water facilitate the milling of the glass, the bentonite helping to keep the glass in suspension in the water. This milling is carried out, for example, for twenty hours if ten tons of glass are milled, until glass fragments having on average a maximum linear dimension of between five and fifteen micrometers are obtained.

Preferably, this dimension is approximately equal to ten microns.

After milling, the process continues with auxiliary steps such as filtration, de-ironing and storage in containers.

If the milled material is collected in specialized containers, it is important to keep it agitated and to take into account any loss of water in order to prevent it forming a relatively compact glassy mass difficult to process.

Next, a metering step 7 is carried out, during which a mixture is produced which includes the fragments 3 possibly carrying some of the bentonite and a sizing compound preferably chosen from esters of alkylsilicic acids, in particular an aminosilane. The amount of this sizing agent (silane) is between five and twenty-five parts per thousand parts by weight of the dry glass. The combination formed by the bentonite present with the fragments and the silane constitutes the sizing composition for the fragments within the meaning of the present invention.

If the glass is collected in a container, the metering is preferably carried out by removing from the container the defined amounts, for example one cubic meter, and simply adding said amounts of additives.

The mixture is treated very carefully in order to prevent the components from separating, particularly by keeping them rapidly stirred, for example by blades rotating at between eighty and one hundred and sixty revolutions per minute.

Next, an agglomeration step 8 is carried out during which said mixture of fragments and sizing composition is dried, preferably by spray drying, so as to form compact granules 2 each including a multiplicity of fragments and of dried portions of the sizing composition.

To carry out this step 8, the mixture of fragments and sizing composition is heated to a drying temperature of between one hundred and twenty-five and one hundred and forty-five degrees Celsius, preferably one hundred and forty degrees Celsius.

This temperature is obtained in a heated vessel into which the mixture is injected by compressed air, so as to form granules 2 having on average a maximum size of between twenty and sixty micrometers, as already mentioned.

In detail, provision is made, for example, for the mixture to be sucked up and then injected by compressed-air sprayers into a drier provided with methane burners.

The preferred temperature of one hundred and forty degrees removes the residual water and, above all, causes the reaction of the silane of the sizing composition which, by solidifying, results in the agglomeration of the fragments 3 into granules 2 and also solidifies the bentonite residues which contribute to the agglomeration.

The filler 1 thus produced, indicated in the box showing the agglomeration step 8, may be conveyed to a packing step 9.

In particular, it may be envisioned to pack the filler into bags 10 or to pack it into large sacks 11 of one thousand kilograms.

The process thus allows the filler 1 to be produced in various steps which are not particularly complex and do not require complex and very expensive equipment.

The invention has significant advantages.

The original structure of the granules, formed from milled glass fragments agglomerated by the same sizing composition as that used to promote bonding between the glass and the plastic or the phenolic resin, eliminates the final step of applying the sizing composition to the microspheres.

Furthermore, the cost of the granules is reduced, both because of the raw materials used, which are mostly simple glass fragments, and because of the manufacturing process which does not include preparation steps requiring large equipment.

The granules produced are compact but rough and thus allow optimum bonding to the plastic without conferring excessive roughness on the latter.

The invention described above in a preferred embodiment is capable of numerous modifications and variants, all falling within the field of the inventive concept. In particular, it is envisioned according to the invention for silane alone to be used to form the sizing composition which agglomerates the fragments 3, the milling possibly being able to be assisted by a plasticizer which does not have a tackifying property in the dry state.

Moreover, further details may be replaced by equivalent elements.

What is claimed is:

1. A glassy filler (1) for plastics and resins, said glassy filler comprising granules (2), wherein said granules comprise a plurality of fragments (3) of a glassy material and a sizing composition (4), and wherein said glassy material is provided with a sizing composition, said sizing composition agglomerating said plurality of fragments of glassy material.

2. The glassy filler as claimed in claim 1, wherein the sizing composition comprises an ester of an alkylsilicic acid.

3. The glassy filler as claimed in claim 1, wherein the sizing composition is an aminosilane.

4. The glassy filler as claimed in claim 3, wherein the aminosilane is of formula $NH_2(CH_2)_3Si(OC_2H_5)_3$.

5. The glassy filler as claimed in claim 1, wherein the granules (2) have a maximum mean size of between 20 and 60 $\mu$m and comprise at least two of the fragments (3).

6. The glassy filler as claimed in claim 1, wherein the fragments (3) have an average maximum linear dimension of between 5 and 15 μm.

7. The glassy filler as claimed in claim 1, wherein the fragments (3) comprise glass.

8. The glassy filler as claimed in claim 7, wherein the glass is an E glass.

9. The glassy filler as claimed in claim 1, wherein the fragments (3) comprise milled glass.

10. The glassy filler as claimed in claim 1, wherein the fragments (3) are portions of at least one glass yarn (5a).

11. The glassy filler as claimed in claim 1, wherein an amount of the sizing composition is between 5 and 50 parts per thousand parts by weight of the glassy material on a dry basis.

12. A process for manufacturing a glassy filler for plastics and resins, wherein said process comprises milling a glassy material to form a plurality of fragments, metering a sizing composition to said fragments to form a mixture, and agglomerating said mixture of said fragments and said sizing composition, wherein agglomerating includes drying the mixture and forming a plurality of compact granules, said granules comprising a multiplicity of said fragments and said dried sizing composition.

13. The process as claimed in claim 12, wherein milling is preceded by selecting a glass yarn from a source including a production waste or a scrap.

14. The process as claimed in claim 12, wherein milling is continued until the fragments have a maximum linear dimension of between 5 and 15 μm.

15. The process as claimed in claim 12, wherein water, a plasticizer, a mineral binder, or combinations thereof, are added during the milling step.

16. The process as claimed in claim 15, wherein the mineral binder is bentonite.

17. The process as claimed in claim 12, wherein the fragments are mixed with an ester of an alkylsilicic acid while forming the mixture.

18. The process as claimed in claim 12, wherein the sizing composition is an aminosilane.

19. The process as claimed in claim 12, wherein the sizing composition is metered in an amount between 5 and 50 parts per thousand by weight based on the dry glassy material.

20. The process as claimed in claim 12, wherein the mixture is heated to a temperature of between 125 and 145° C. during agglomerating.

21. The process as claimed in claim 12, wherein agglomerating is carried out in a heated vessel and the mixture is injected into said vessel by means of compressed air, wherein said process forms a plurality of granules having an average maximum size of between 20 and 60 μm.

* * * * *